UNITED STATES PATENT OFFICE.

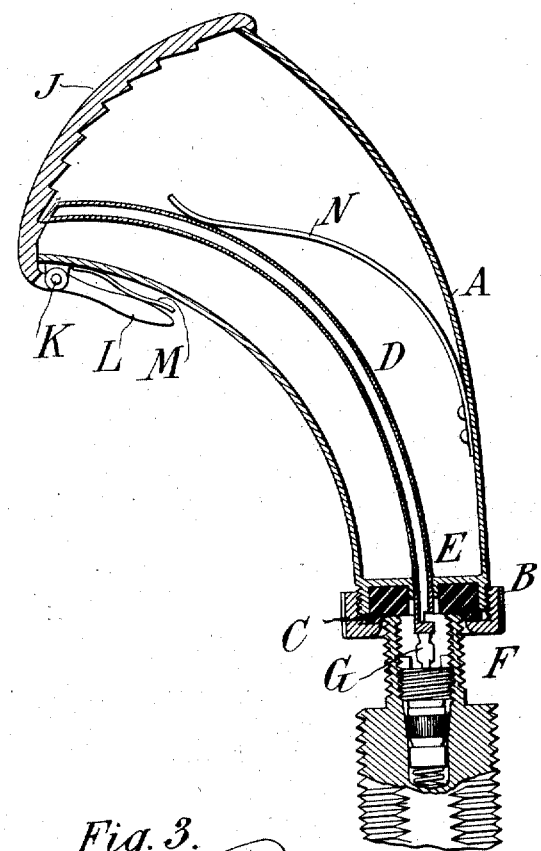
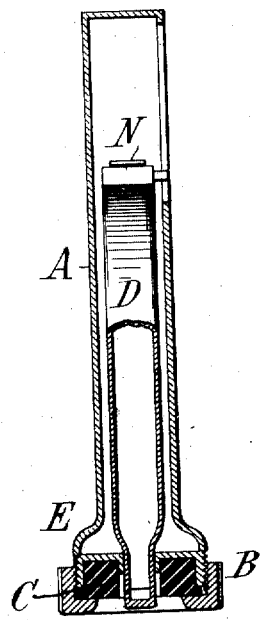
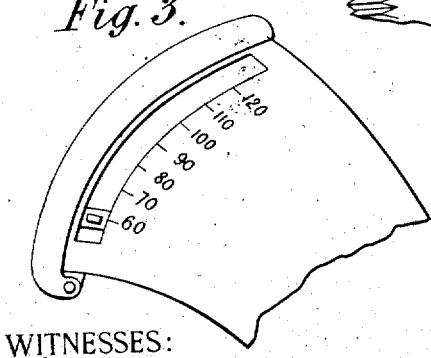

HENRY P. KRAFT, OF RIDGEWOOD, AND MAXIMILIAN CHARLES SCHWEINERT, OF WEST HOBOKEN, NEW JERSEY.

PRESSURE-GAGE.

1,221,548.      Specification of Letters Patent.      Patented Apr. 3, 1917.

Application filed August 10, 1910, Serial No. 576,580. Renewed June 27, 1916. Serial No. 106,264.

*To all whom it may concern:*

Be it known that we, HENRY P. KRAFT, residing in Ridgewood, in the county of Bergen and State of New Jersey, and MAXIMILIAN CHARLES SCHWEINERT, residing in West Hoboken, in the county of Hudson and State of New Jersey, both citizens of the United States, have invented certain new and useful Improvements in Pressure-Gages, of which the following is a specification.

This invention relates to pressure gages, and aims to provide certain improvements therein.

The object of the present invention is to provide a small and compact pressure gage or indicator for pneumatic tires or the like which is of cheap and simple construction. Various gages have heretofore been proposed but these have commonly involved the use of a piston or similar member designed to be moved against the tension of a spring by the pressure of the air. It is difficult in this type of gage to pack the piston sufficiently to prevent leakage while avoiding any friction which would disturb the precision of its indications. Our present invention is designed to provide a gage in which the use of a piston is avoided and which is extremely simple and cheap in its construction, and not likely to become inoperative in use. According to our invention we employ as an indicating member a tube of metal or other suitable substance which is normally curved, and which tends to straighten out when air under pressure is admitted within it. Such tube is preferably not bent to spiral form but is given only a slight curvature corresponding preferably to about a quarter of a circle. The end of the tube constantly has an arc of movement, the center of which more or less approximates in position the fixed end of a tube. Means are provided for registering the varying degrees of pressure so that when the gage is removed from the tire valve for instance its indications can be read even though the pressure within the tube is relieved.

The invention involves certain other features of improvement which will be hereinafter pointed out.

Referring to the drawings which illustrate one form of the invention,—

Figure 1 is a sectional view of the gage on an enlarged scale.

Fig. 2 is a view substantially at right angles to Fig. 1 showing the gage in section.

Fig. 3 is an elevation of the upper part of Fig. 2.

Referring to the drawings let A indicate a suitable casing of curved form having at its lower end a cap B which is designed to retain a packing disk C within the end of the casing. Mounted in the casing is a tube D, the lower end of which passes through and is connected to a disk E with a leak-tight joint, the disk being held within the end of the casing in any suitable manner. At its lower end the tube D is closed but it is provided with a lateral opening F so that when the gage is pressed down over a tire valve as shown in Fig. 1, the imperforate end of the tube will depress a deflating pin G of the tire and air will pass through the opening F into the interior of the tube. The packing C at this time forms a leak-tight joint around the upper end of the valve shell so that the air cannot escape except into the tube D. The tube is constructed of light metal or rubber or other suitable material, of which a tube can be formed which will have the necessary capacity of straightening out under pressure, and of returning to its initial shape when the pressure is relieved. The tube is preferably flattened out.

At its upper end the casing is preferably enlarged to accommodate a greater range of movement of the tube at this end. As the tube straightens out under pressure its end describes an arc, the center of which is not far removed from the lower end of the tube. Any suitable means may be provided for utilizing the movement of the tube and to indicate the pressures. For simplicity, however, I prefer to use the tube itself as a pointer and to provide a scale H which may be conveniently marked upon or attached to the side of the casing as indicated in Fig. 3. A window or opening I is provided through which the end of the tube is visible.

An important feature of the invention is the provision of means whereby indications are registered so that after the gage is removed from a pneumatic tire valve for instance, the indications may be read notwithstanding that the pressure within the tube is relieved. Various means may be provided for accomplishing this result, but we prefer the construction illustrated in Fig. 1 wherein a ratchet J is employed following in shape the arc of movement of the end of the tube D and provided with a series of teeth which are designed to be successively engaged by the end of the tube. The casing A is preferably movably mounted so that it may be pressed outwardly against the ratchet bar J of the tube as the latter passes the high points of the teeth in the bar. In the construction shown the bar is pivoted at K and is provided with a thumb piece or handle L which is rigidly fixed to the body of the bar. A spring M is preferably provided which presses against the under side of the thumb piece and normally holds the bar J in its inward position. As the tube rides past the teeth, the bar moves outward slightly to engaging position. In some cases the bar may be fixed and the elasticity of the tube relied upon to permit its end to move past the teeth. We prefer the spring construction shown since it not only reduces the resistance to movements of the tube but also permits the easy restoration of the tube to its normal or initial position. This is done by pressing the thumb piece L inwardly after the pressure is relieved. By preference the ratchet bar J is formed as a cover for the casing A or as a part of the cover.

In some cases it may be necessary or desirable to reinforce the action of the tube D either to cause it to have sufficient resistance to the pressure or to restore it to its normal condition after the pressure is removed. In such cases a spring may be employed arranged in such manner as to resist the straightening of the tube. A simple arrangement is shown in Fig. 1 wherein the spring is constructed as a leaf spring having its lower end attached to the casing and its upper end bearing against the tube D near the free end of the latter.

The gage thus provided is extremely cheap and simple to manufacture. It is of convenient shape to be carried in the pocket and has no parts which are liable to get out of order. The use of a piston is avoided and the whole construction is free from complication.

While we have described in detail one form of the invention, it is to be understood that we do not wish to be limited thereto since various changes may be made therein without departing from the invention.

What we claim is:—

1. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, and means for holding said tube in its varying positions.

2. A pressure gage having a pressure member comprising a tube curved through an arc of approximately 90°, and adapted to straighten under pressure, means for indicating the pressures including said tube or a part of the indicating means, and means for holding said tube in its varying positions.

3. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, and means for holding said tube in its varying positions, said means comprising a ratchet bar.

4. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, and means for holding said tube in its varying positions, said means comprising a curved ratchet bar.

5. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, means for holding said tube in its varying positions, said means comprising a ratchet bar, and means for yieldingly holding said ratchet bar in position.

6. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, and means for holding said tube in its varying positions, said means comprising a pivoted spring-mounted ratchet bar adapted to be moved by hand from its engaging to its disengaging position.

7. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, and means for holding said tube in its varying positions, said means comprising a spring-mounted ratchet bar curved to correspond to the path of movement of the end of said tube, and adapted to engage said end.

8. A pressure gage having a pressure member comprising a curved tube, one end of which is adapted to be connected with a source of pressure, and the other end of which is adapted to move as the tube straightens under pressure, and a fixed part past which said tube moves, said part and tube constituting a scale and indicating member, means for holding said tube in its varying positions, said means comprising a spring-mounted ratchet bar curved to correspond to the path of movement of the end of said tube and adapted to engage said end, and a handle for releasing said bar.

9. A pressure gage comprising a casing having a part adapted to fit the end of a tire valve, a tube in said casing having its lower end in connection with said part, and said tube being curved to materially less than a semi-circle, a scale on said casing past which the end of said tube moves as i straightens under pressure, and a spring mounted curved ratchet bar adapted to engage the end of said bar in its varying positions, and means for releasing said tub therefrom.

10. A pressure gage for pneumatic tire comprising a casing, a pressure tube withi said casing curved through an arc of approximately 90° and adapted to straighten unde pressure, means for detachably connectin said gage with the valve of a pneumati tire for admitting air to said tube, an means for depressing the deflating-pin the tire valve, said means constituting an extension of said pressure tube.

In witness whereof, we have hereun signed our names in the presence of two su scribing witnesses.

HENRY P. KRAFT.
MAXIMILIAN CHARLES SCHWEINERT.

Witnesses:
T. F. WALLACE,
FRED WHITE

It is hereby certified that in Letters Patent No. 1,221,548, granted April 3, 1917 upon the application of Henry P. Kraft, of Ridgewood, and Maximilian Charie Schweinert, of West Hoboken, New Jersey, for an improvement in "Pressure-Gages," an error appears in the printed specification requiring correction as follows: Page ', line 72, claim 2, for the word "or" read *as;* and that the said Letters Patent shoul be read with this correction therein that the same may conform to the record of the case in the Patent Office.

Signed and sealed this 30th day of April, A. D., 1918.

[SEAL.]

F. W. H. CLAY,

*Acting Commissioner of Patents.*

Cl. 73 — 109.